United States Patent [19]

Trzeciak et al.

[11] Patent Number: 4,656,521
[45] Date of Patent: Apr. 7, 1987

[54] DIGITAL DISTORTION-CORRECTING CIRCUIT FOR PROJECTION A FLAT IMAGE ON A CURVED SCREEN FROM A DIGITAL DATA SOURCE FOR A SIMULATOR PROJECTED-IMAGE VISUAL SYSTEM

[75] Inventors: John R. Trzeciak; James A. Turner, both of Binghamton, N.Y.

[73] Assignee: The Singer Company, Binghamton, N.Y.

[21] Appl. No.: 718,581

[22] Filed: Apr. 1, 1985

[51] Int. Cl.⁴ .............................................. H04N 5/74
[52] U.S. Cl. ...................... 358/231; 358/74; 434/40
[58] Field of Search .............. 358/231, 104, 97, 93, 358/160, 209, 903; 364/522; 434/43, 44, 40

[56] References Cited

U.S. PATENT DOCUMENTS

| 3,757,040 | 9/1973 | Bennett | 358/104 |
| 4,571,631 | 2/1986 | Breglia | 358/231 |
| 4,599,645 | 7/1986 | Brown | 358/104 |

FOREIGN PATENT DOCUMENTS 2445567  8/1980  France ................... 434/40

*Primary Examiner*—Tommy P. Chin
*Attorney, Agent, or Firm*—Douglas M. Clarkson

[57] ABSTRACT

A simulator projected-image system includes a distortion-correcting circuit to modify flat-image data that is stored sequentially in a Random Access Memory by connecting a source of random address to obtain selected video data from the memory in a predetermined order and a circuit to combine the selected video data to form an image that is substantially free from distortion when projected on a curved screen.

11 Claims, 3 Drawing Figures

DIGITAL DISTORTION-CORRECTING CIRCUIT FOR PROJECTION A FLAT IMAGE ON A CURVED SCREEN FROM A DIGITAL DATA SOURCE FOR A SIMULATOR PROJECTED-IMAGE VISUAL SYSTEM

BACKGROUND

The present invention, generally, relates to a projected-image visual system as used in a simulator and, more particularly, relates to a digital distortion-correcting circuit for projecting a flat image on a curved screen in such a visual system.

Visual scenes that are viewed in the real world are simulated by projecting images from a video source onto a screen.

For large fields of view (FOV's), generally the screen surface is curved with the projection optics projecting over a wide angle.

The video output, which usually consists of a database transformed onto a flat image plane, must be processed by a suitable electronic system before it is projected onto a curved screen surface.

It is this processing function that is required of the electronic system that the present invention is concerned. This processing function is termed "mapping" in the art.

"Mapping" is defined as changing the output video elements from the image source such that the inherent time relationships of the elements is not equivalent to the resultant spatial relationships on the projector plane.

"Mapping" is required in the electronic system for three basic reasons, including (1) nominal design, (2) manufacturing tolerances, and (3) drifts. There are elements of a nominal system which require "mapping". The digital image source compensates for the fact that both the projection and the viewing point are not at the same center.

However, the image source can only produce "mapping" which is suitable for projection on a flat screen by a special-purpose projector. In addition to the mapping requirement identified above, the special-purpose projector has some sweep non-linearity inherent in its nominal design that requires some "mapping" correction.

Several elements of the visual system are subject to manufacturing tolerances to a sufficient degree that an alignable "mapping" corrector must be utilized to reduce distortion to acceptable levels. Examples of these include projector sweep non-linearities, wide-angle lens system geometric distortion, and spherical screen radius.

The "mapping" that is required in the environment described above is provided by the distortion-correcting circuit of the present invention.

INVENTION OBJECTS AND SUMMARY

Accordingly, it is an important object of the present invention to provide a distortion-correcting circuit that will effectively correct a flat image that is projected onto a curved screen without introducing distortion.

It is a further object of the invention to provide such a circuit that is effective in a digital environment.

It is another object of the invention to provide such a circuit that is effective in any image source for providing a perspectively correct image on a curved screen.

Broadly, a digital video mapping circuit constructed and arranged in accordance with the present invention provides a first means to store video data. The circuit of the invention has also a second means to store random addresses to obtain from the first means selected video data in a predetermined order, and a third means to combine the selected video data to form the mapped image, so that a pre-distorted image is projected onto the curved screen in such a manner that it will appear correct to a viewer in the operator's position of the simulator.

THE DRAWINGS

In the accompanying drawings, forming a part of this specification, in which like numerals identify like parts in the various figures.

INVENTION DETAILS

In a simulator visual system where images are projected over substantial distances onto a large curved screen, such as a dome, there are several reasons why distortion appears to exist. One of these reasons is that the operator is viewing the image from a different position from that which the image is projected. Another is that an image constructed to be projected onto a flat screen 12b will appear distorted when projected onto a curved screen 12g. An example of this is a straight line which will appear as a straight line on a flat surface, but will appear curved when projected on a curved screen.

A circuit that is constructed and arranged in accordance with the principles of the present invention contemplates predistorting the image so that when it is projected onto a curved screen, it will appear visually correct and undistorted. The circuit of the present invention offers a new and improved way of accomplishing the predistorting function.

Figure 1:
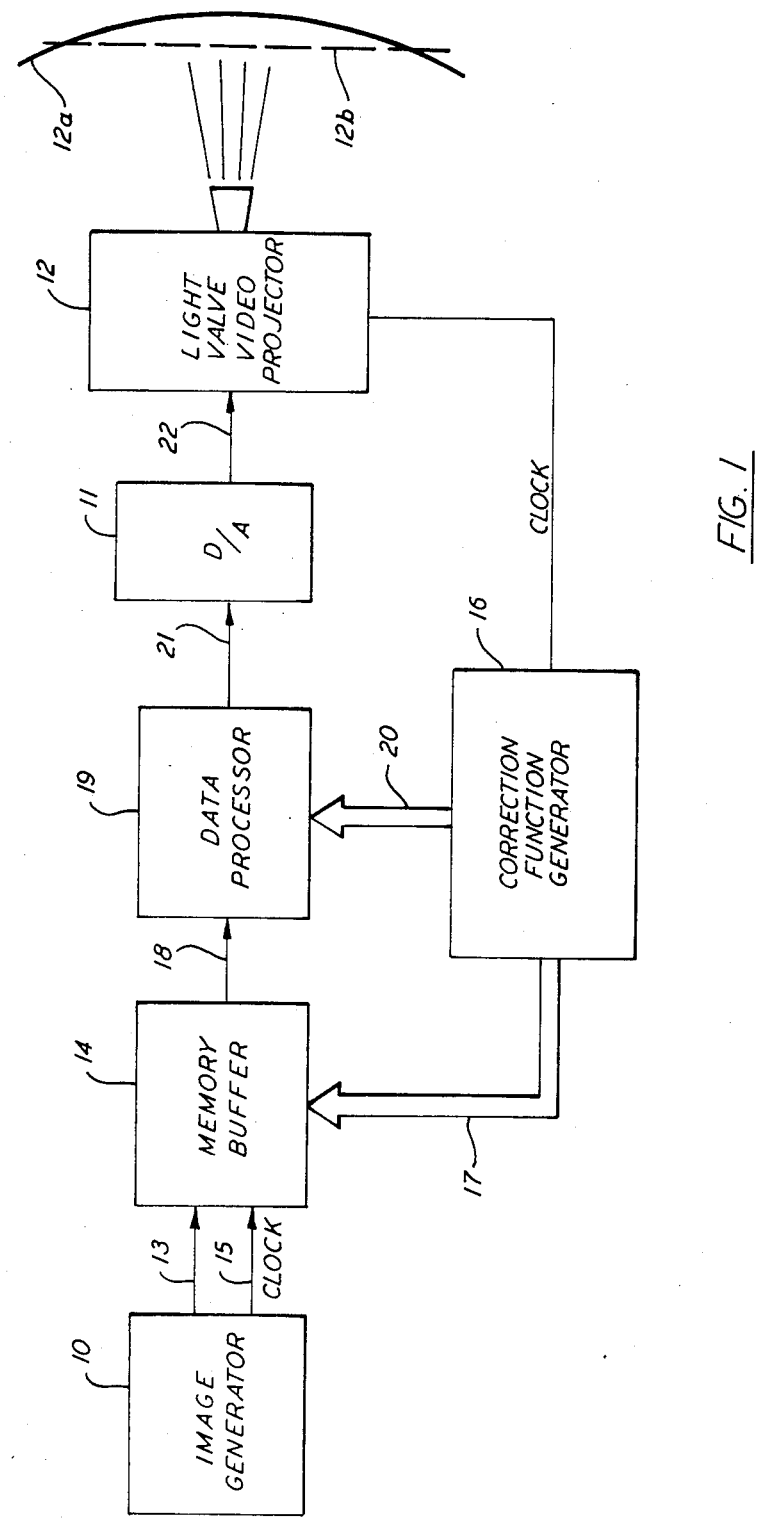
FIG. 1 is a block diagram of a digital distortion-correcting circuit that is constructed and arranged in accordance with the invention.

Referring now to FIG. 1 of the drawings, an image generator 10 can be any suitable source of video data, such as a computer image generator, a video camera or a graphics generator (for providing a suitable test pattern). The digital data provided by the image generator normally would be converted to analog form by a digital-to-analog converter 11. The analog signal, then, is used to drive a 1,000 lumen light-valve projector, such as, for example, G. E. P/N 5155. Such a light-valve video projector is identified in FIG. 1 of the drawings by the numeral 12.

This same digital visual image generated by the source can now, with the circuit of the present invention, be projected onto a screen that is curved. Before proceeding with a detailed description of the operation of the circuit in accordance with the invention, a broad, general explanation will be presented.

The visual image in digital form as generated by the generator 10 is connected directly over a line 13 to a memory buffer 14 where it is stored sequentially. A separate line 15 is used to connect a series of clock pulses to the memory buffer 14 to maintain the same clock rate.

Figure 2:
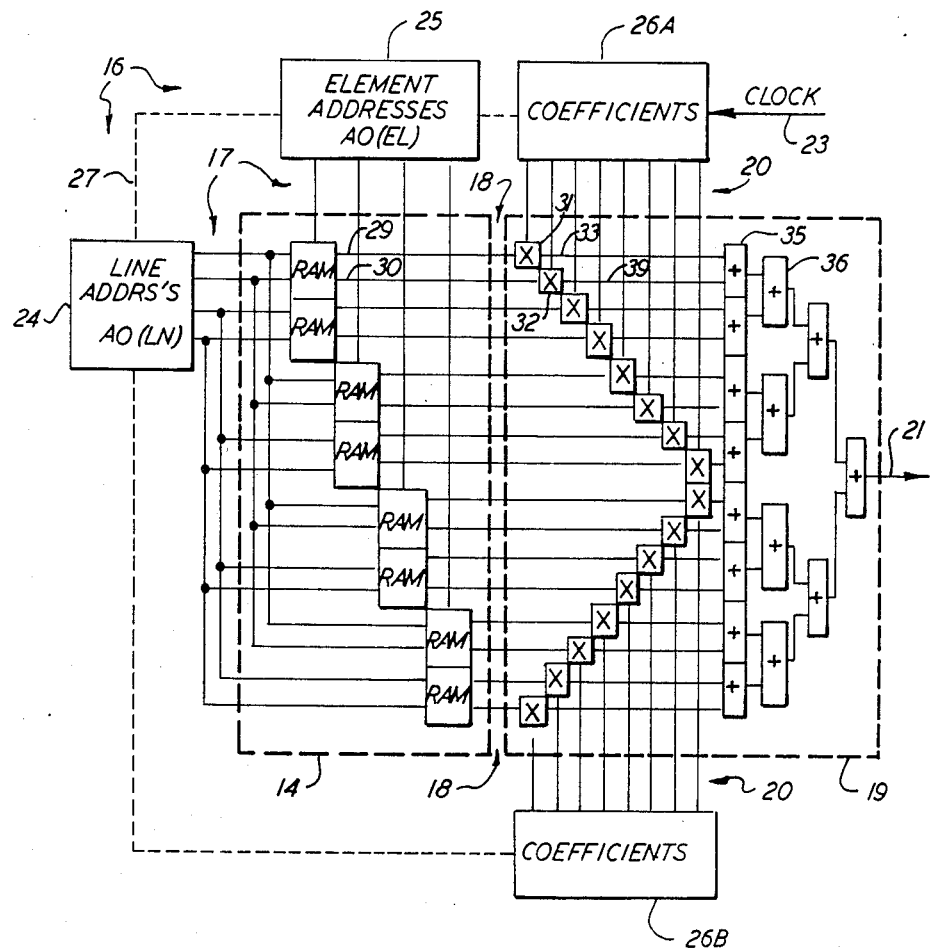
FIG. 2 is a block diagram showing the details, interconnections, and arrangement of respective component parts to make up the invention shown more broadly in FIG. 1.

While the visual image data is stored in the memory buffer 14 sequentially, it is read out at random under the control of a correction function generator 16, as will be explained in more detail in connection with FIG. 2 presently. This control from the correction function generator 16 of the visual image data stored in the memory buffer 14 is in the form of address control signals over a bus 17.

The randomly selected video data from the memory buffer 14 is connected directly over a line 18 to a data processor circuit 19. As the selected video data proceeds through the data processor circuit 19, the illumination factor for each pixel receives a supplemental weighting coefficient applied to it over a bus 20 from the correction function generator circuit 16.

The output from the data processor circuit 19 is connected directly over a line 21 to the digital-to-analog converter circuit 11, the analog signal output of which is connected over a line 22 to the light-valve video projector 12. The operation of the correction function generator circuit 16 is maintained in timed relationship with the projected image by means of a connection 23 for a clock reference signal from the light-valve video projector 12.

In FIG. 2 of the drawings, a line addresses circuit 24, an element addresses circuit 25 and the two coefficients circuits 26A and 26B are indicated, by the broken line 27, as being all of the correction function generator 16, in FIG. 1. The memory buffer circuit 14, in FIG. 1, is indicated in FIG. 2 as being a plurality of individual Random Access Memory units (RAM). The data processor 19, in FIG. 1, is shown in FIG. 2 as including a plurality of individual multiplier units and a plurality of adder units with two input connections 18 and 20 and with a single output connection 21.

One of the Random Access Memory circuits within the memory buffer 14 is identified by the reference numeral 28 as having two output lines identified by the reference numerals 29 and 30, respectively. The output line 29 is connected by the bus 18 to a multiplier circuit 31 within the data processor 19, and the output line 30 is connected, also by the bus 18, to a second multiplier circuit 32 within the data processor 19.

Each of the two multiplier circuits 31 and 32 have respective output lines 33 and 34 connected as the two input lines to an "adder" circuit, identified in FIG. 2 by the reference numeral 35. The "adder" circuit 35 in FIG. 2 has a single output line 36.

Figure 3:
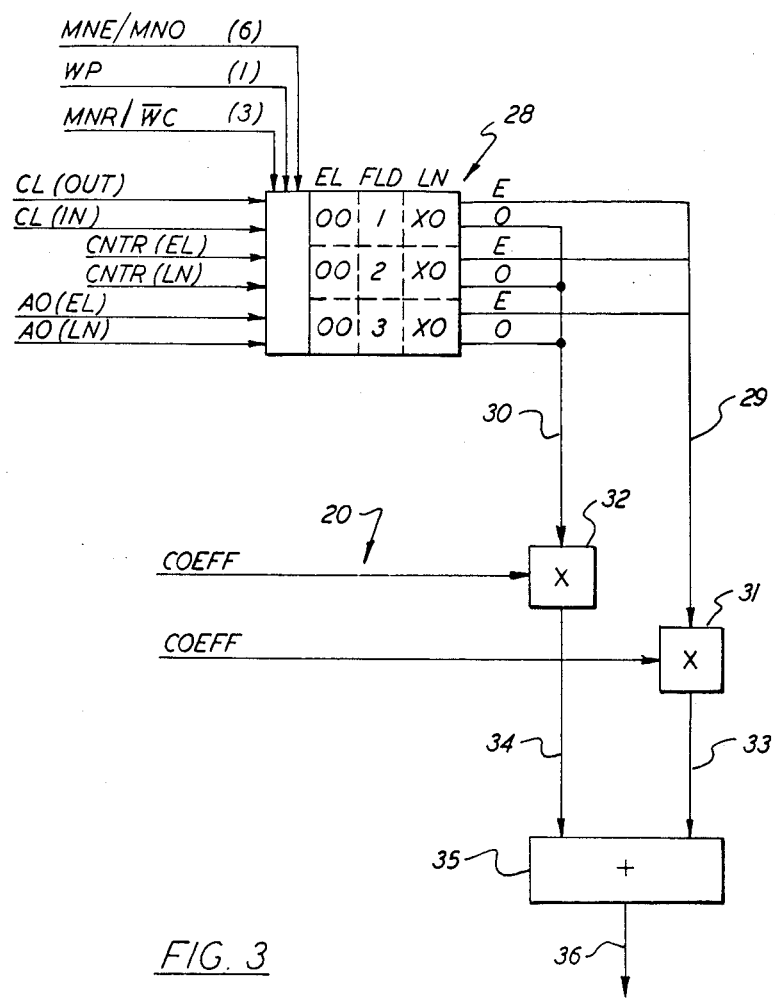
FIG. 3 is a block diagram showing one of the component parts that make up the plurality shown in FIG. 2.

Reference is made now to FIG. 3 of the drawings for the purpose of explaining, in still further detail, the circuit shown in FIG. 2. In FIG. 3, the Random Access Memory circuit (or "RAM"), identified also be the reference numeral 28, is shown with a plurality of input lines. The line with the legend "CL(OUT)" is for controlling the data rate out that is randomly selected by the correction function generator 16 over the bus 17 as explained previously.

The input line with the legend "CL(IN)" is a connection for receiving a clock rate for controlling the data input as it is stored sequentially. The two lines with the legends "CNTR (EL)" and "CNTR (LN)", respectively, indicate the Element Counter signals and the Line Counter signals for the data stored sequentially in the RAM 28. The two lines in with the legends "AO (EL)" and "AO (LN)", respectively, identify the "Element Address" signal input and the "Line Address" signal input, also respectively.

There are six timing lines that control the Random Access Memory circuit 28, and these are identified with the legends "MNE/MNO, which identify the Memory No. Even/Odd lines. The single line with the legend "WP" is for the Write Pulse signal, and there are three lines with the legends "MNR/WC" which identify the Memory No. Read/NOT-Write control lines.

The various legends indicated within the Random Access Memory circuit 28, in FIG. 3, are for the purpose of identifying one suitable address method for storing data in the memory 28. Of course, other suitable address legends may be adopted, if desired.

Since the light valve video projector 12, FIG. 1, is capable of completing a frame of projected information in one-thirtieth of a second only, and since the operating speed limitations of the respective components shown in the circuit of FIG. 2 is only one-sixtieth of a second, two circuits of the type shown in FIG. 2 are connected to operate in parallel, one for each of two fields per one frame of projected image. Of course, as technology advances and components with faster operating speeds become available, perhaps it will be possible to utilize only a single one of the circuit arrangements of FIG. 12.

While the preferred embodiment of the present invention has been shown and described in detail, it is apparent to those skilled in the art that modifications and changes may be made without departing from the spirit of the invention and the scope of the claims.

The embodiments of the invention in which an exclusive property or privilege is claimed are defined in the claims appended hereinafter.

We claim:

1. In a simulator projected-image visual system, a distortion-correcting circuit to modify a flat image for projection on a curved screen to produce an image that is substantially free from distortion, comprising:

random access memory means including connections for storing video data sequentially and for accessing stored video data randomly to represent a predetermined undistorted image when projected on a flat screen;

means to store random addresses to obtain selected video data from said random access memory means in a predetermined order, and means to modify said selected video data by combining with a data signal representing a predetermined weighted average to form said image that is substantially free from distortion when projected on a curved screen.

2. A distortion-correcting circuit according to claim 1 including a source of video data separate from said distortion-correcting circuit for generating said flat image, and including bus means to connect said video data to said distortion-correcting circuit.

3. A distortion-correcting circuit according to claim 2 wherein said video data from said source is digital in form, and a digital-to-analog converter means to convert said combined video data to analog form.

4. A distortion-correcting circuit according to claim 3 including video projector means connected to receive the output from said digital-to-analog converter means.

5. A distortion-correcting circuit according to claim 4 wherein said video projector means is in the form of a light-valve video projector to receive said output from said digital-to-analog converter means.

6. A distortion-correcting circuit according to claim 1 wherein said means to modify said selected video data includes a plurality of multiplier circuit means.

7. A distortion-correcting circuit according to claim 6 wherein said multiplier circuit means has two input connection means, one to receive said selected video data and the other to receive said weighted average data signal.

8. A distortion-correcting circuit according to claim 7 wherein said multiplier circuit means has a single output connection means.

9. A distortion-correcting circuit according to claim 8 including a plurality of ADDER circuit means, each connected to receive said weighted average data signals from two multiplier circuit means.

10. A distortion-correcting circuit according to claim 1 wherein said random access memory includes connection means to receive predetermined address signals to identify the video data to be selected.

11. A distortion-correcting circuit according to claim 10 wherein said random access memory includes a plurality of separate connection means to receive said predetermined address signals.

* * * * *